(12) United States Patent
Hennessy et al.

(10) Patent No.: US 9,519,887 B2
(45) Date of Patent: Dec. 13, 2016

(54) SELF-SERVICE DATA IMPORTING

(71) Applicant: Bank of America Corporation, Charlotte, NC (US)

(72) Inventors: Norman Hennessy, Columbia, SC (US); Amitha Kshirsagar, Charlotte, NC (US); Gustavo A. Liriano, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 85 days.

(21) Appl. No.: 14/572,135

(22) Filed: Dec. 16, 2014

(65) Prior Publication Data

US 2016/0171445 A1  Jun. 16, 2016

(51) Int. Cl.
*G06F 9/44* (2006.01)
*G06Q 10/10* (2012.01)

(52) U.S. Cl.
CPC ................................ *G06Q 10/1053* (2013.01)

(58) Field of Classification Search
None
See application file for complete search history.

(56) References Cited

U.S. PATENT DOCUMENTS

| | | | | |
|---|---|---|---|---|
| 4,658,351 A * | 4/1987 | Teng | ...................... | G06F 9/4881 718/103 |
| 5,729,710 A * | 3/1998 | Magee | .................... | G06F 9/544 711/170 |
| 6,708,324 B1 * | 3/2004 | Solloway | ............ | G06F 11/3688 714/E11.208 |
| 8,161,386 B1 * | 4/2012 | Mark | ...................... | G06Q 10/06 715/705 |
| 2003/0051188 A1 * | 3/2003 | Patil | ..................... | G06F 11/3672 714/4.4 |
| 2007/0185754 A1 * | 8/2007 | Schmidt | ................. | G06Q 10/06 705/7.13 |
| 2009/0049443 A1 * | 2/2009 | Powers | ................... | H04L 67/10 718/100 |
| 2012/0089700 A1 * | 4/2012 | Safruti | ............... | H04L 67/2842 709/217 |
| 2016/0171399 A1 * | 6/2016 | Santhanam | ........ | G06Q 10/0637 705/7.36 |

* cited by examiner

*Primary Examiner* — Chameli Das
(74) *Attorney, Agent, or Firm* — Banner & Witcoff, Ltd.; Michael A. Springs

(57) ABSTRACT

Aspects of the disclosure relate to methods, systems, and apparatuses for self-service data importing. In some aspects, a user may interact with a data importing server to import data into a database and/or manipulate existing data and/or data associations in the database. The data importing server may contain files or scripts of different specifications or processes to perform for a plurality of predefined jobs. The user may interact with the data importing server via a user interface. The user interface may outline each step in the process and enable steps only after the user has completed a previous, prerequisite step. The user interface may provide user selectable buttons to input user commands, and the user selectable buttons may initially be disabled and become enabled after the user or the system performs the corresponding prerequisite step.

20 Claims, 5 Drawing Sheets

SELF-SERVICE DATA IMPORTING

BACKGROUND

Personnel with special technical knowledge or training are sometimes needed to load and/or modify data in a database. Reliance on technical personnel for loading and/or modification of data is inefficient in terms of both time resources and monetary resources. A person requesting the loading of data or modification of data must wait for technical personnel to handle the person's request, and when the process includes multiple requests and responses between the person and technical personnel, much time may be spent waiting for the other person to respond to the latest request.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, systems, and apparatuses for self-service data importing. In some aspects, a user may interact with a data importing server to import data into a database and/or manipulate existing data and/or data associations in the database. The data importing server may contain files or scripts of different specifications or processes to perform for a plurality of predefined jobs. Each file or script may define the parameters needed for a predefined job including input files, file locations, and processes to perform to execute the predefined job. Before executing the predefined job in a real-time environment, a user may be required to execute the predefined job in a test environment to protect data in the real-time environment from data corruption or unauthorized manipulation which may be caused by executing the predefined job in the real-time environment.

In some aspects, the user may interact with the data importing server via a user interface. The user interface may outline each step in the process and enable steps only after the user has completed a previous, prerequisite step. In some aspects, the user interface may provide user selectable buttons to input user commands, and the user selectable buttons may initially be disabled and become enabled after the user or the system performs the corresponding prerequisite step.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

It is noted that various connections between elements are discussed in the following description. It is noted that these connections are general and, unless specified otherwise, may be direct or indirect, wired or wireless, and that the specification is not intended to be limiting in this respect.

Figure 1:
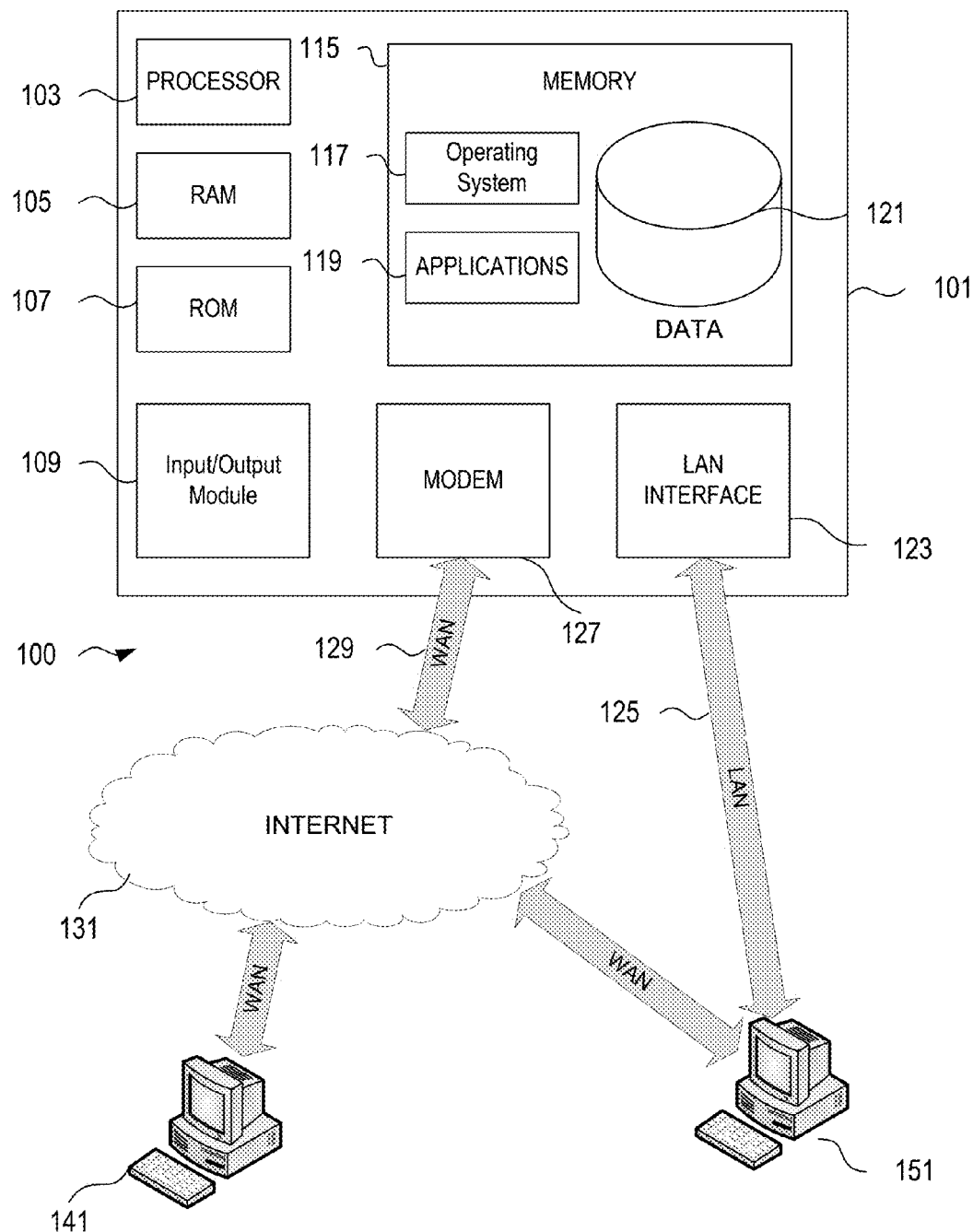
FIG. 1 illustrates an example operating environment in which various aspects of the disclosure may be implemented.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed arrangements is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. Computing devices 141 or 151 may be a mobile device (e.g., smart phone) communicating over a wireless carrier channel.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
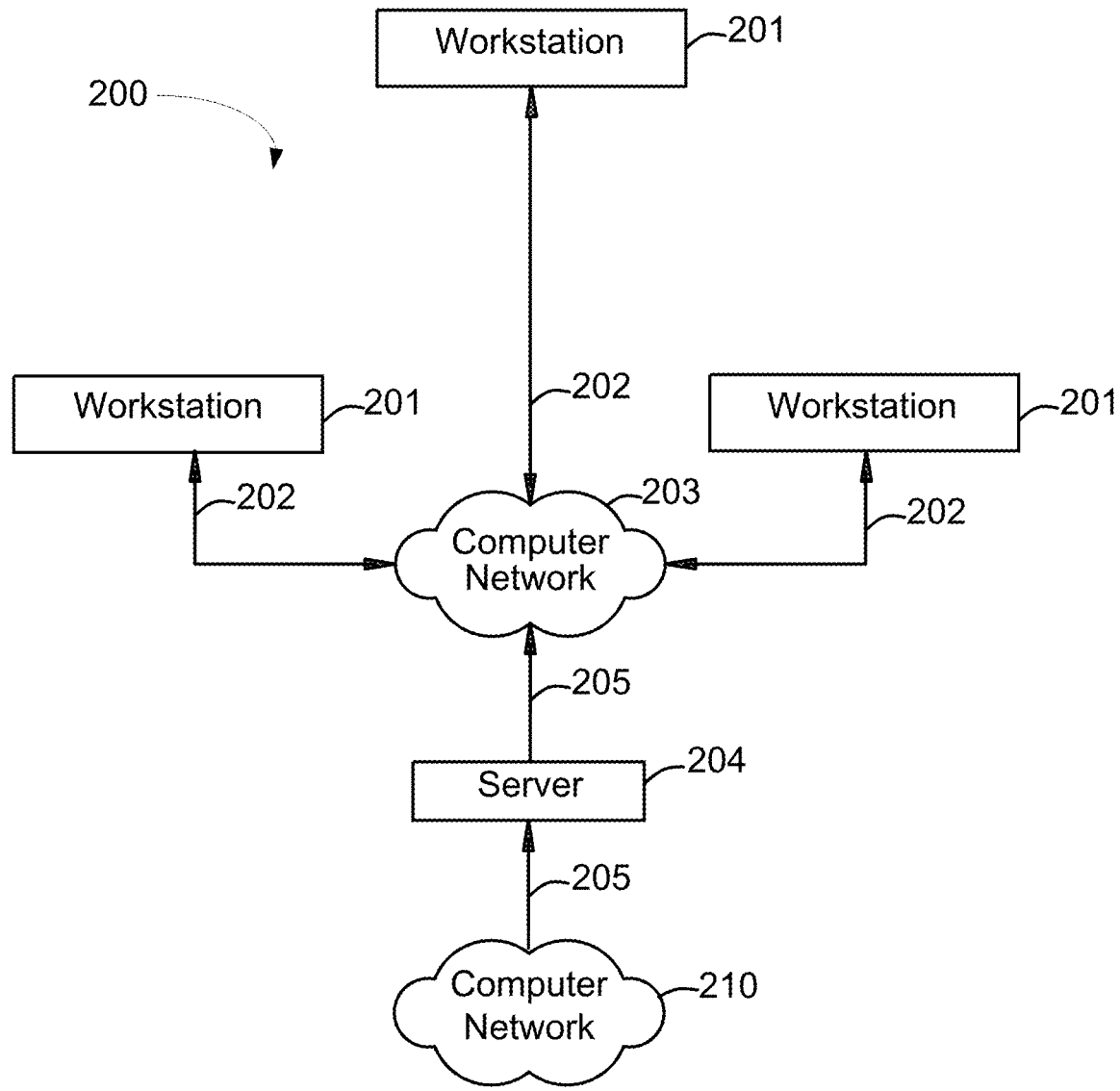
FIG. 2 is an illustrative block diagram of workstations and servers that may be used to implement the processes and functions of certain aspects of the present disclosure according to one or more aspects described herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine.

Figure 3:
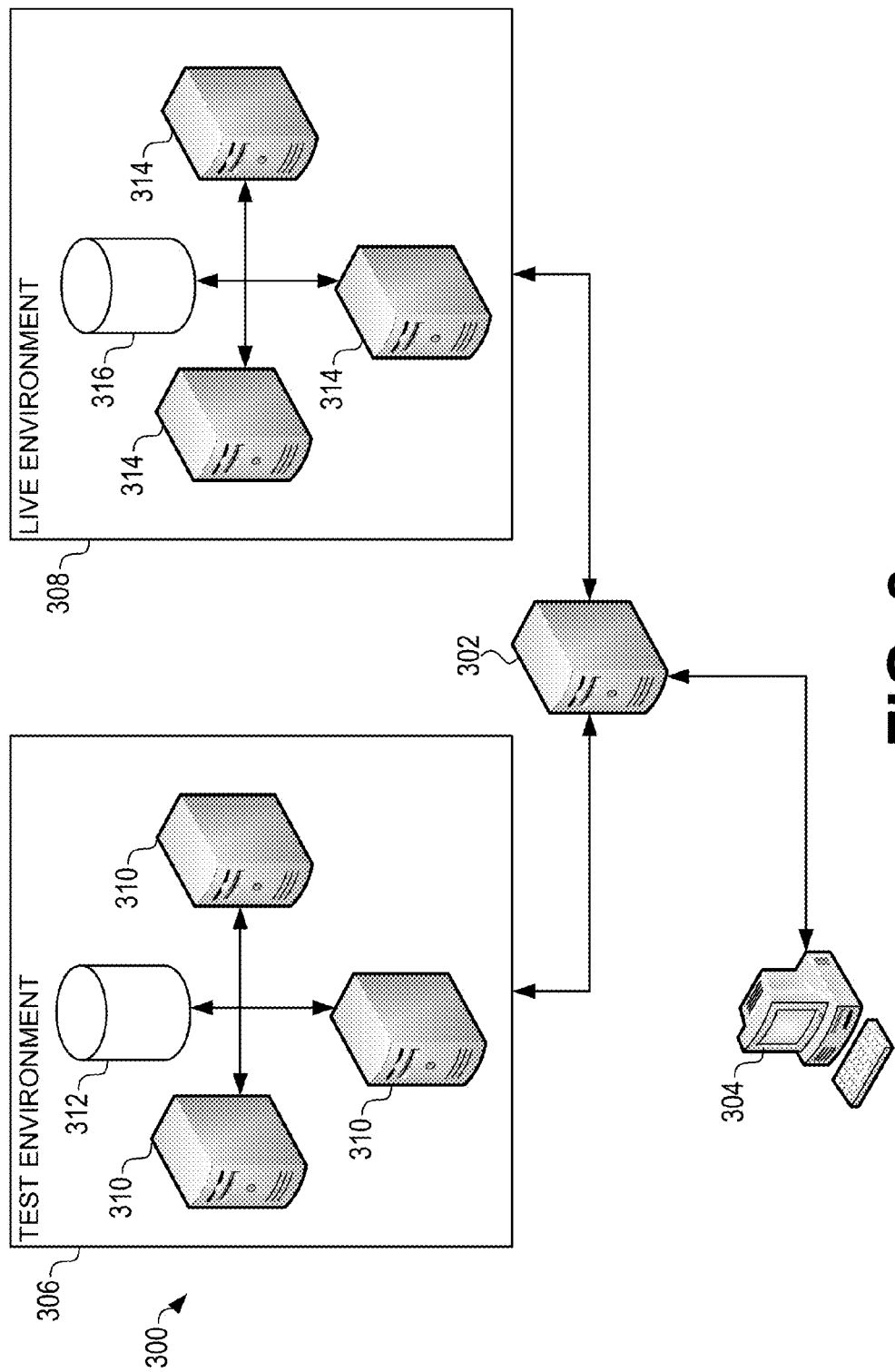
FIG. 3 illustrates an example system according to one or more aspects described herein.

FIG. 3 shows an illustrative self-service data importing system 300 according to aspects described herein. Self-service data importing system 300 includes a data importing server 302, a workstation 304, a test environment 306, and a real-time environment 308. The test environment may include test servers 310 and test databases 312, and real-time environment 308 may include servers 314, databases 316, the operating environment shown in FIG. 1, and/or the system shown in FIG. 2. Data importing server 302 may provide a self-service data loading tool 400 to a user of workstation 304 to enable the user to import data into database 316 of the system and perform various verification steps without requiring that the user have specialized knowledge or skills while protecting the system from corrupt or incorrect data. Data server 302 can bridge the gap between the user of workstation 304, test environment 306, and real-time environment 308 to enable a user to interact with data server 302, for example via tool 400, to perform the entire data importing or data modification process. Test environment 306 and real-time environment 308 may each have a data loading application that executes the selected job in its environment. Tool 400 can provide a simple interface and step-by-step guidance to facilitate a test of any job in test environment 306 before allowing the job to execute in a production, live, customer, or real-time environment 308. Data importing server 302 can receive user input via workstation 304 regarding a predefined job to perform and receive an input file for a predefined job or a location to an input file for the predefined job. The input file can be locally stored on the workstation 304 and imported to data importing server 302 from the workstation 304. Data importing server can pass the input file to the data loading application of the appropriate environment and cause or instruct the data loading application to execute the selected job in test 306 or live environment 308.

Each predefined job may be directed to a specific purpose. For example, a data loading or importing job may be to delete system or network access for employees who have left an organization. For this job, a data file such as a spreadsheet containing information about the former employees may be imported into the system using a self-service data importing tool, and the system can use the information about former employees to change access permissions of the user accounts associated with the former employees or delete the user accounts of the former employees. Some predefined jobs might not use or require an input file. These predefined jobs may be to manipulate data and/or data associations of data already in the database or system. As an example, a user group may be given special permissions to perform certain tasks in a system. A new user may be added to the system, but the new user may need to be added to the user group in order to have permission to perform certain tasks in the system. Using the self-service tool, a user can add the new user to the user group by adding an association to the user group in the new user's account information. The user can select a new user and select a user group to which the new user should be added.

Data server 302 may include specific processes or scripts for each predefined job. In other words, each predefined job may have its own processes or scripts specifying the parameters associated with each job and the steps or functions to be performed by data server 302 for each job. The scripts for a job may define a standard file format to be used for the particular job. For example, for a predefined job that uses an input spreadsheet file, the script may define the information to be placed in each column in the spreadsheet, a destination location of the data in the database, and/or a storage location or path for where the input is to be stored. The destination location may be, for example, a file location, file path, and a storage location in a database. As another example, for a predefined job which manipulates data flows, a spreadsheet may be used as an input file which specifies the changes to the locations from which an application gets data and/or locations to where the application sends data. An executable application in the live environment may use the data in the spreadsheet to implement or execute the specified changes. Similarly, for the test environment, an executable application in the test environment can use the data in the spreadsheet to run checks against data corruption on the data in the spreadsheet as well as test run the job process in the test environment.

Workstation 304 in system 300 may be one or more workstations similar to computing device 101 and workstation 201. Workstation 304 can interact with data server 302 which may be one or more servers similar to computing device 101 and server 204 over a computer network 203 or internet 131. Data server 302 may connect to test environment 306 and live environment 308 via one or more networks similar to network 201 or internet 131.

Figure 4:
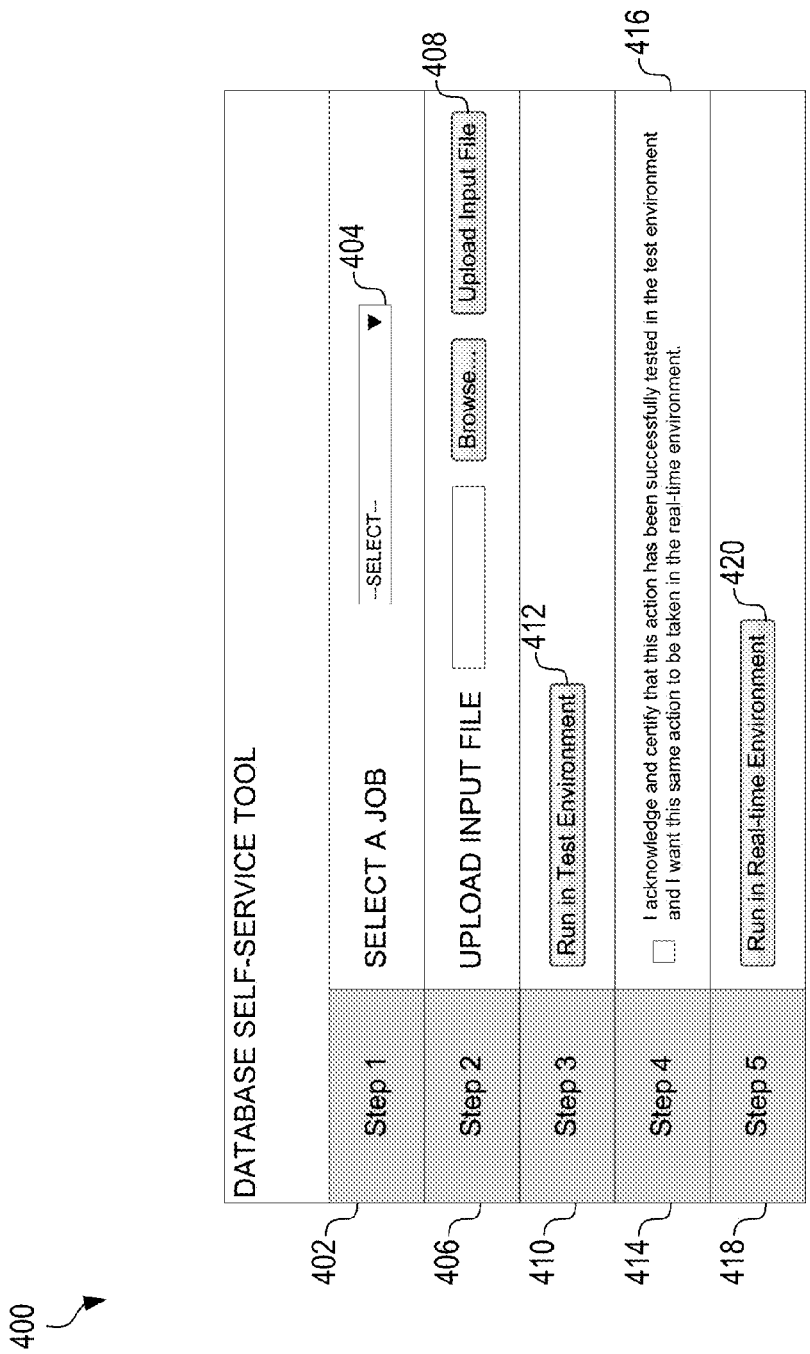
FIG. 4 illustrates an example user interface according to one or more aspects described herein.

FIG. 4 shows an example user interface of a self-service tool 400 which can be used with the self-service data importing method 500 according to aspects described herein. Self-service tool 400 may be implemented on data server 302 and accessed by the user via the user's workstation 304, for example, via an internet browser on workstation 304. Self-service tool 400 is beneficial in that self-service tool 400 guides the user by providing clear steps and instructions as to how to execute the predefined jobs. Tool 400 can provide a single interface through which the user can interact with the system. Tool 400 furthermore protects the system and the data already in the system from being corrupted, unauthorized modifications, or importing incorrect data because the tool 400 only allows the user to perform certain predefined steps or functions and controls the order in which the user can perform these steps and when the user is allowed to perform these steps. For example, later steps may only be enabled once certain earlier, prerequisite steps are performed.

The user interface of self-service tool 400 outlines five steps for importing data into the database and/or manipulating or changing data associations in the database. In Step 1 shown in area 402, the user is instructed to select a job from dropdown menu 404. After selecting a predefined job from menu 404, the user can proceed to Step 2 shown in area 406 and select an input file to upload if the selected job accepts or requires an input file. Once an input file has been selected, button 408 for inputting a command to upload the selected input file is enabled, and the user can select button 408 to upload the selected input file. In some aspects, enabling button 408 may occur after data server 302 validates the selected file, for example, the file name and/or file type of the selected file. After the input file is uploaded in Step 2, the user can proceed to Step 3 shown in area 410 and execute a test run of the job in test environment 306. Similar to upload input file button 408, button 412 to run the selected job in test environment 306 may become enabled only after the input file has been successfully validated. After the job passes in test environment 306, the user can proceed to Step 4 shown in area 414 to acknowledge and certify that the selected job and input file combination passed tests applied to it in test environment 306. After the user acknowledges and certifies that the selected job passed the tests in test environment 306, button 420 to run the job in a live or production environment 308 becomes enabled for selection in Step 5 shown in area 418. Upon selection of button 420, data server 302 instructs the servers 314 and databases 316 to execute the selected job and passes the input file, if any, to the servers 314 and databases 316 in live environment 308.

Figure 5:
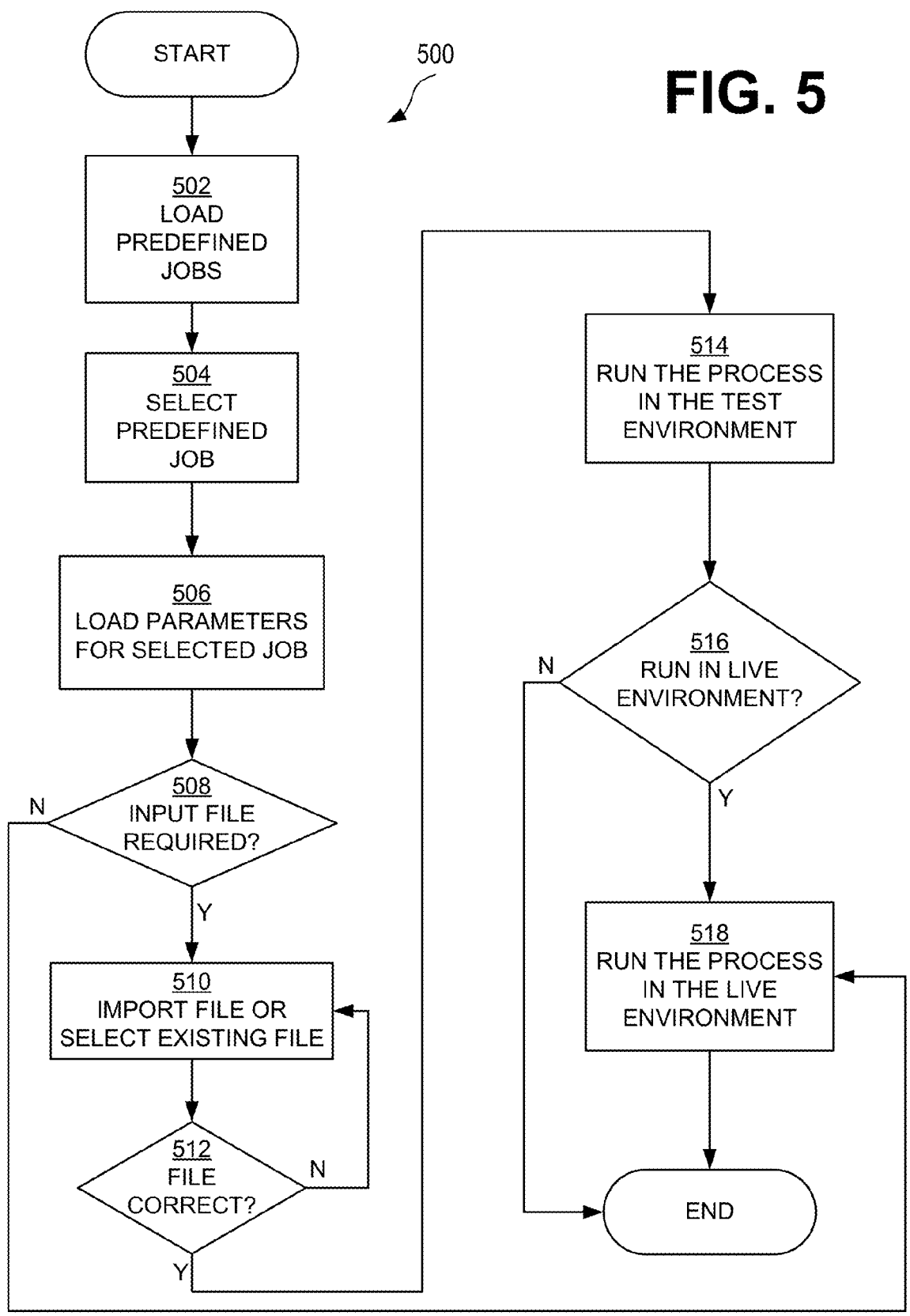
FIG. 5 illustrates an example self-service data importing method according to aspects described herein.

FIG. 5 shows an illustrative self-service data importing method 500 according to aspects described herein. As described herein, method 500 can guide any user through the process of importing data into a live database and/or manipulating data associations in a live database while still having the user perform all needed checks on the data before allowing the data or data changes in the live environment. Starting with step 502, a user may initiate the self-service tool 400, and the system may load a plurality of predefined jobs which are stored in data server 302. The predefined jobs may include jobs loading data into the database and/or jobs modifying data and/or data associations of data already in the database. At step 504, the user may select a job that the user would like to execute from the list of predefined jobs in the dropdown menu 402. At step 506, data server may load the parameters for the selected job including the inputs needed to complete the job. For each predefined job, a script may be present in the data server 302 specifying parameters associated with the predefined job such as input files needed to execute the job. At step 508, data server can determine whether the selected job requires an input file based on the script for the job type. A data importing type job may specify that an input file is required and the file name, file type, and/or file location for the input file. Data server may load the file name, file type, and/or file location defined for the job. At step 510, an input file may be selected for upload or importing. Self-service tool 400 may automatically load the file location for the job as defined in the script. The user may be given the option to select a different file location for the file. Once the user has found the selected input file acceptable, the user may select an upload input file button 408 to upload the input file to the server. At step 512, upon input file selection or after the user selects upload input file button 408, data server 302 can validate the file by determining whether the selected input file meets the requirements for the selected job. For example, server 302 can determine whether the file name of the selected file matches the acceptable file names specified for the selected job in the job script and whether the file type of the selected file (e.g., spreadsheet file, word processor file, etc.) matches acceptable file types specified for the selected job. The user may selected a recently uploaded and/or validated file (e.g., uploaded and/or validated within the past 3 days, 5 days, week, etc.), and the recently uploaded and/or validated file may be automatically validated for the current session or the selected job. Data server 302 can indicate via the self-service tool 400 whether the selected file meets the requirements of the input file for the selected job. If the file is determined to be correct at step 512, the user may then run the selected job in a test environment in step 514. If the file is determined to be incorrect at step 512, data server 302 may return to step 510 and prompt the user to select a new file, and button 512 to run the selected job in a test environment may remain disabled to assure that the user can not attempt to run the selected job with an incorrect file in the test environment.

Returning to step 514, in running or executing the selected job in the test environment, data server 302 may return the results of the test run to the user. For example, a log file from the test environment server may be returned to data server 302 which provides the log file to the user. The user can examine the test log to confirm whether all tests run on the selected job in the test environment were passed. At step 516, data server 302 can determine whether the user has certified that the selected job has been successfully run in the test environment, and upon user certification of the successful test run, button 420 to run the selected job in the live environment may become enabled. At step 518, the user can select button 420 to run the selected job in the live environment using the selected input file, if any.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:
1. A method, comprising:
   presenting, by a computing device, a list of predefined jobs to a user;
   enabling user selection of a job to execute from the list of predefined jobs;
   receiving user input selecting a job to execute from the list of predefined jobs;
   loading requirements from a script stored in the computing device and specifying parameters for the selected job;
   determining, based on the script and a job type, whether the selected job requires an input file based on stored requirements for the selected job;
   in response to determining that the selected job requires an input file, enabling selection of an input file;
   receiving a user selection of an input file;
   determining whether the input file is valid for the selected job including validating a file name and file type of the input file;
   receiving a user command to execute the selected job in a test environment;
   in response to receiving the user command and validating the file name and file type of the input file, loading the input file, sending the input file to a server in the test environment, and initiating execution of the selected job in the test environment;
   after initiating execution of the selected job in the test environment, enabling user certification that the executed job and selected input file passed at least one test in the test environment;
   receiving user certification that the executed job and selected input file passed the at least one test in the test environment; and
   after receiving the user certification, sending the input file to a real-time production environment different from the test environment and initiating execution of the selected job in the real-time production environment.
2. The method of claim 1, wherein
   validating the file name of the input file includes determining whether the file name matches a file name in the script for the selected job.
3. The method of claim 1, wherein
   validating the file type of the input file includes determining whether the file type matches a file type in the script for the selected job.
4. The method of claim 1, wherein determining whether the input file is valid for the selected job further includes:
   determining whether the input file has been uploaded recently.

5. The method of claim 1, further comprising:
receiving at least one test log file for the executed job from the test environment;
sending the at least one test log file to the user.

6. The method of claim 1, further comprising:
in response to receiving the user certification, enabling a user command to initiate the execution of the selected job in the real-time production environment.

7. The method of claim 1, further comprising:
in response to determining that the input file is valid for the selected job, enabling a user to initiate the execution of the selected job in the test environment.

8. An apparatus, comprising:
at least one processor; and
a memory storing computer-readable instructions that, when executed by the at least one processor, cause the apparatus to:
present a list of predefined jobs to a user;
enable user selection of a job to execute from the list of predefined jobs;
receive user input selecting a job to execute from the list of predefined jobs;
loading requirements from a script stored in the apparatus and specifying parameters for the selected job;
determine, based on the script and a job type, whether the selected job requires an input file based on stored requirements;
in response to determining that the selected job requires an input file, enable selection of an input file;
receive a selection of an input file;
determine whether the input file is valid for the selected job including validating a file name and file type of the input file;
receive a user command to execute the selected job in a test environment;
in response to receiving the user command and validating the file name and file type of the input file, load the input file, send the input file to a server in the test environment, and initiate execution of the selected job to in the test environment;
after initiating execution of the selected job in the test environment, enable user certification that the executed job and selected input file passed the at least one test in the test environment;
receive user certification that the executed job and selected input file passed the at least one test in the test environment; and
after receiving the user certification, sending the input file to a real-time production environment and initiating execution of the selected job in the real-time production environment.

9. The apparatus of claim 8, wherein
validating the file name of the input file includes determining whether the file name matches a file name in the script for the selected job.

10. The apparatus of claim 8, wherein
validating the file type of the input file includes determining whether the file type matches a file type in the script for the selected job.

11. The apparatus of claim 8, wherein determine whether the input file is valid for the selected job further includes:
determine whether the input file has been uploaded recently.

12. The apparatus of claim 8, wherein the memory further stores computer-readable instructions that, when executed by the at least one processor, cause the apparatus to:
receive at least one test log file for the executed job from the test environment;
send the at least one test log file to the user.

13. The apparatus of claim 8, wherein the memory further stores computer-readable instructions that, when executed by the at least one processor, cause the apparatus to:
in response to receiving the user certification, enable a user command to initiate the execution of the selected job in the real-time production environment.

14. The apparatus of claim 8, wherein the memory further stores computer-readable instructions that, when executed by the at least one processor, cause the apparatus to:
in response to determining that the input file is valid for the selected job, enable a user to initiate the execution of the selected job in the test environment.

15. One or more non-transitory computer-readable media having computer-executable instructions stored thereon that, when executed, cause at least one computing device to:
present a list of predefined jobs to a user;
enable user selection of a job to execute from the list of predefined jobs;
receive user input selecting a job to execute from the list of predefined jobs;
loading requirements from a script stored in the at least one computing device and specifying parameters for the selected job;
determine, based on the script and a job type, whether the selected job requires an input file based on stored requirements for the selected job;
in response to determining that the selected job requires an input file, enable selection of an input file;
receive a user selection of an input file;
determine whether the input file is valid for the selected job including validating a file name and file type of the input file;
receive a user command to execute the selected job in a test environment;
in response to receiving the user command and validating the file name and file type of the input file, load the input file, send the input file to a server in the test environment, and initiate execution of the selected job in the test environment;
after initiating execution of the selected job in the test environment, enable user certification that the executed job and selected input file passed at least one test in the test environment;
receive user certification that the executed job and selected input file passed the at least one test in the test environment; and
after receiving the user certification, send the input file to a real-time production environment and initiate execution of the selected job in the real-time production environment.

16. The one or more non-transitory computer-readable media of claim 15, wherein validating the file name and file type includes:
determining whether the file name of the input file matches a file name in the script for the selected job; and
determining whether the file type of the input file matches a file type in the script for the selected job.

17. The one or more non-transitory computer-readable media of claim 15, wherein determine whether the input file is valid for the selected job further includes:
determine whether the input file has been uploaded recently.

18. The one or more non-transitory computer-readable media of claim 15, wherein the computer-executable instructions stored thereon that, when executed, cause at least one computing device to:
   receive at least one test log file for the executed job from the test environment;
   send the at least one test log file to the user.

19. The one or more non-transitory computer-readable media of claim 15, wherein the computer-executable instructions stored thereon that, when executed, cause at least one computing device to:
   in response to receiving the user certification, enable a user command to initiate the execution of the selected job in the real-time production environment.

20. The one or more non-transitory computer-readable media of claim 15, wherein the computer-executable instructions stored thereon that, when executed, cause at least one computing device to:
   in response to determining that the input file is valid for the selected job, enable a user to initiate the execution of the selected job in the test environment.

\* \* \* \* \*